(12) United States Patent
Nagaosa et al.

(10) Patent No.: US 11,478,861 B2
(45) Date of Patent: Oct. 25, 2022

(54) CHUCK-CLAW COUPLING MECHANISM

(71) Applicant: HOWA MACHINERY, LTD., Kiyosu (JP)

(72) Inventors: Hiroshi Nagaosa, Kiyosu (JP); Shin Yoshida, Kiyosu (JP)

(73) Assignee: HOWA MACHINERY, LTD., Kiyosu (JP)

( * ) Notice: Subject to any disclaimer, the term of this patent is extended or adjusted under 35 U.S.C. 154(b) by 0 days.

(21) Appl. No.: 17/290,668

(22) PCT Filed: Oct. 29, 2019

(86) PCT No.: PCT/JP2019/042267
§ 371 (c)(1),
(2) Date: Apr. 30, 2021

(87) PCT Pub. No.: WO2020/090779
PCT Pub. Date: May 7, 2020

(65) Prior Publication Data
US 2021/0379676 A1    Dec. 9, 2021

(30) Foreign Application Priority Data

Oct. 31, 2018  (JP) .............................. JP2018-204924

(51) Int. Cl.
*B23B 31/16* (2006.01)
*B23B 31/39* (2006.01)

(52) U.S. Cl.
CPC ........ *B23B 31/16279* (2013.01); *B23B 31/39* (2013.01); *Y10T 279/1993* (2015.01)

(58) Field of Classification Search
CPC ............... B23B 31/16279; B23B 31/39; Y10T 279/1993
See application file for complete search history.

(56) References Cited

U.S. PATENT DOCUMENTS

| 4,198,067 A | 4/1980 | Steinberger |
| 4,725,065 A | 2/1988 | Hiestand |
| 4,982,970 A | 1/1991 | Otani et al. |
| 7,862,051 B2* | 1/2011 | Rehm ..................... B23B 31/32 279/124 |
| 8,221,296 B2* | 7/2012 | Hildebrandt ...... B23B 31/16279 279/124 |

(Continued)

FOREIGN PATENT DOCUMENTS

| JP | S64-34108 U | 3/1989 |
| JP | H04-201006 A | 7/1992 |
| JP | 3081236 B2 | 8/2000 |

OTHER PUBLICATIONS

Feb. 4, 2020 Search Report issued in International Patent Application No. PCT/JP2019/042267.

*Primary Examiner* — Eric A. Gates
(74) *Attorney, Agent, or Firm* — Oliff PLC

(57) ABSTRACT

A chuck-claw coupling mechanism includes a coupling member provided in a master jaw, a first resilient member, and an operation unit. The coupling member is movable between a coupling position at which the coupling member is coupled to the claw, and a separation position at which the coupling member is separated from the claw. The first resilient member urges the coupling member toward the coupling position. The operation unit moves the coupling member to the separation position.

12 Claims, 9 Drawing Sheets

(56) References Cited

U.S. PATENT DOCUMENTS

2005/0218608 A1* 10/2005 Taglang ............ B23B 31/16279
  279/121
2006/0145432 A1    7/2006 Ubele et al.

* cited by examiner

CHUCK-CLAW COUPLING MECHANISM

TECHNICAL FIELD

The present invention relates to a chuck-claw coupling mechanism for coupling a claw to a master jaw provided in a chuck body.

BACKGROUND ART

A mechanism shown in Patent Document 1 has been conventionally known as the aforementioned chuck-claw coupling mechanism. A master jaw is inserted into a second guide groove of a body, and the master jaw is provided with locking means. The locking means has a meshing member and a coupling piece. The meshing member has a rack to be meshed with a rack of the jaw. An operation element that operates the locking means is accommodated in a cylindrical hole opening to an outer circumferential surface of the body. The operation element is configured to be movable and rotatably by using a handle from outside the body. Thus, the rack of the meshing member of the locking means is engaged with the rack of the jaw to be inserted to a first guide groove so that the jaw is locked onto the master jaw through the meshing member.

Patent Document 1: JP3081236B

DISCLOSURE OF THE INVENTION

In view of the above problem, the object of the present invention is to provide a chuck-claw coupling mechanism capable of rapidly coupling a claw to a master jaw.

The present invention provides a chuck-claw coupling mechanism for coupling a claw to a master jaw provided in a chuck body, comprising:

a coupling member provided in the master jaw, the coupling member being movable between a coupling position at which the coupling member is coupled to the claw, and a separation position at which the coupling member is separated from the claw;

a first resilient member that urges the coupling member toward the coupling position; and an operation unit that moves the coupling member to the separation position.

In the aforementioned chuck-claw coupling mechanism, the coupling member may have an engagement groove part;

the operation unit may have an operation member that is capable of being moved into and retracted from the engagement groove part, the operation member being movable between an engagement position at which the operation member is moved into and engaged with the engagement groove part of the coupling member, and a disengagement position at which the operation member is retracted from the engagement position to be disengaged from the engagement groove part; and in a state where the operation member is located at the engagement position, the coupling member may be located at the separation position.

In the aforementioned chuck-claw coupling mechanism, the operation unit may have: an unlocking member that is movable between a first unlocking-member position at which the unlocking member locates the operation member at the engagement position, and a second unlocking-member position at which the unlocking member locates the operation member at the disengagement position; and a second resilient member that urges the unlocking member toward the second unlocking-member position.

In the aforementioned chuck-claw coupling mechanism, the unlocking member may move the operation member through a first transmission mechanism; and the first transmission mechanism may have a first inclination groove part provided on one of the operation member and the unlocking member, and a first inclination projection part provided on the other thereof, the first inclination projection part extending along the first inclination groove part to be engaged with the first inclination groove part.

In the aforementioned chuck-claw coupling mechanism, an acute angle of angles, which are defined by a direction along which the first inclination groove part and the first inclination projection part extend, and a movement direction of the unlocking member, may be less than 45°.

In the aforementioned chuck-claw coupling mechanism, the chuck body may be provided with an unlocking hole into which the unlocking member is movably inserted; and the unlocking hole may open to a front surface of the chuck body.

In the aforementioned chuck-claw coupling mechanism, a first seal member may be fitted between the unlocking member and the unlocking hole, in a front part of the unlocking hole.

In the aforementioned chuck-claw coupling mechanism, the operation unit may further have a locking member that is movable between a locking position at which the locking member locks the operation member located at the engagement position, and an unlocking position at which the locking member unlocks the operation member.

In the aforementioned chuck-claw coupling mechanism, the operation unit may further have: a lock holding member that is movable between a first holding-member position at which the lock holding member locates the locking member at the locking position, and a second holding-member position at which the lock holding member locates the locking member at the unlocking position; and a third resilient member that urges the lock holding member toward the second holding-member position.

In the aforementioned chuck-claw coupling mechanism, the lock holding member may move the locking member through a second transmission mechanism; and the second transmission mechanism may have a second inclination groove part provided on one of the locking member and the lock holding member, and a second inclination projection part provided on the other thereof, the second inclination projection part extending along the second inclination groove part to be engaged with the second inclination groove part.

In the aforementioned chuck-claw coupling mechanism, the chuck body may be provided with a lock holding hole into which the lock holding member is movably inserted; and the lock holding hole may open to the front surface of the chuck body.

In the aforementioned chuck-claw coupling mechanism, a second seal member may be fitted between the lock holding member and the lock holding hole, in a front part of the lock holding hole.

The present invention can rapidly couple the claw to the master jaw.

DESCRIPTION OF EMBODIMENTS

An embodiment of the present invention is described herebelow with reference to the drawings. In this embodiment, an example in which a chuck is secured to a spindle of a machine tool, such as an NC lathe, is described.

Figure 1:
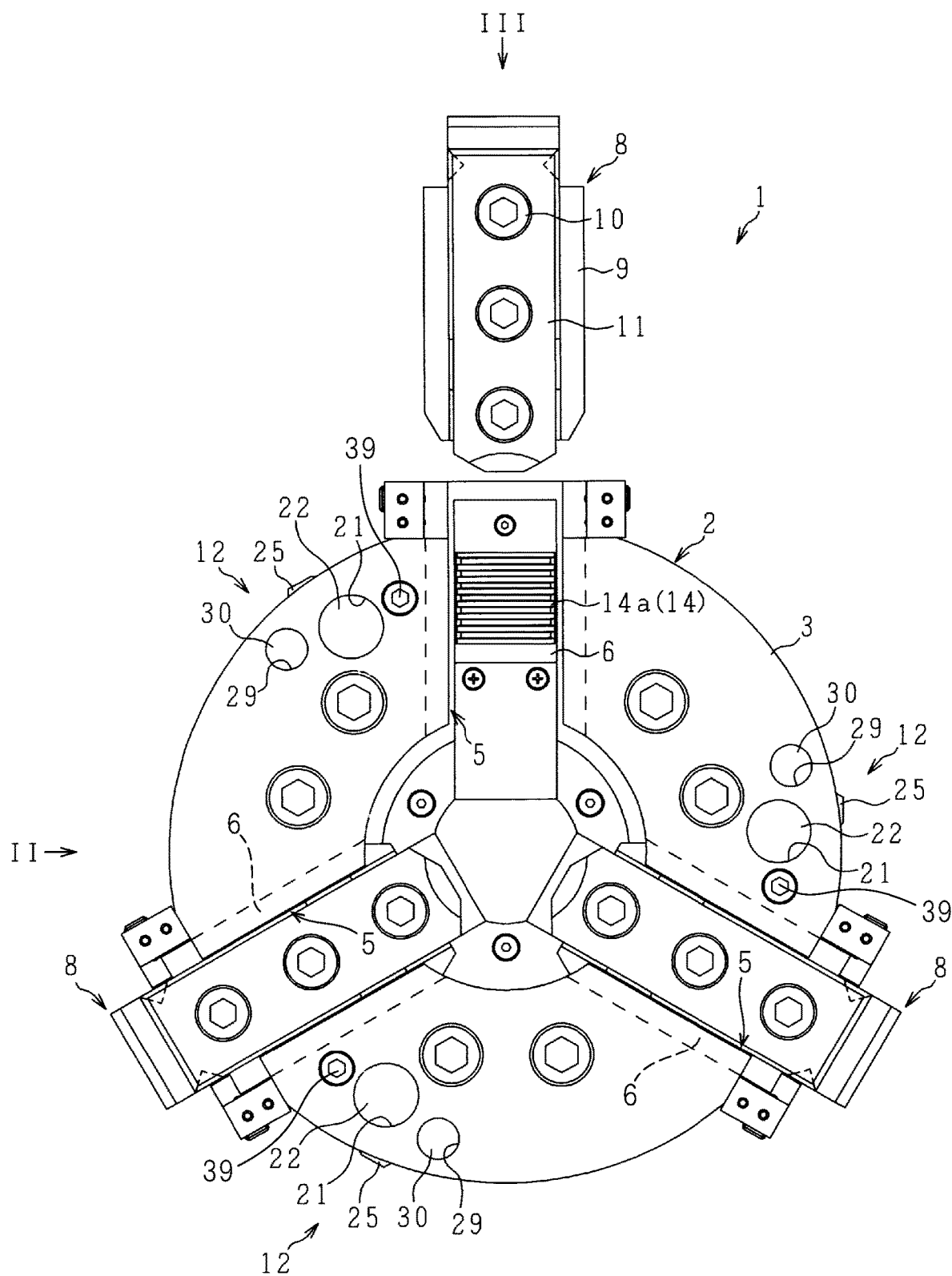
FIG. 1 is view showing a chuck comprising a claw coupling mechanism according to an embodiment of the present invention.
Figure 2:
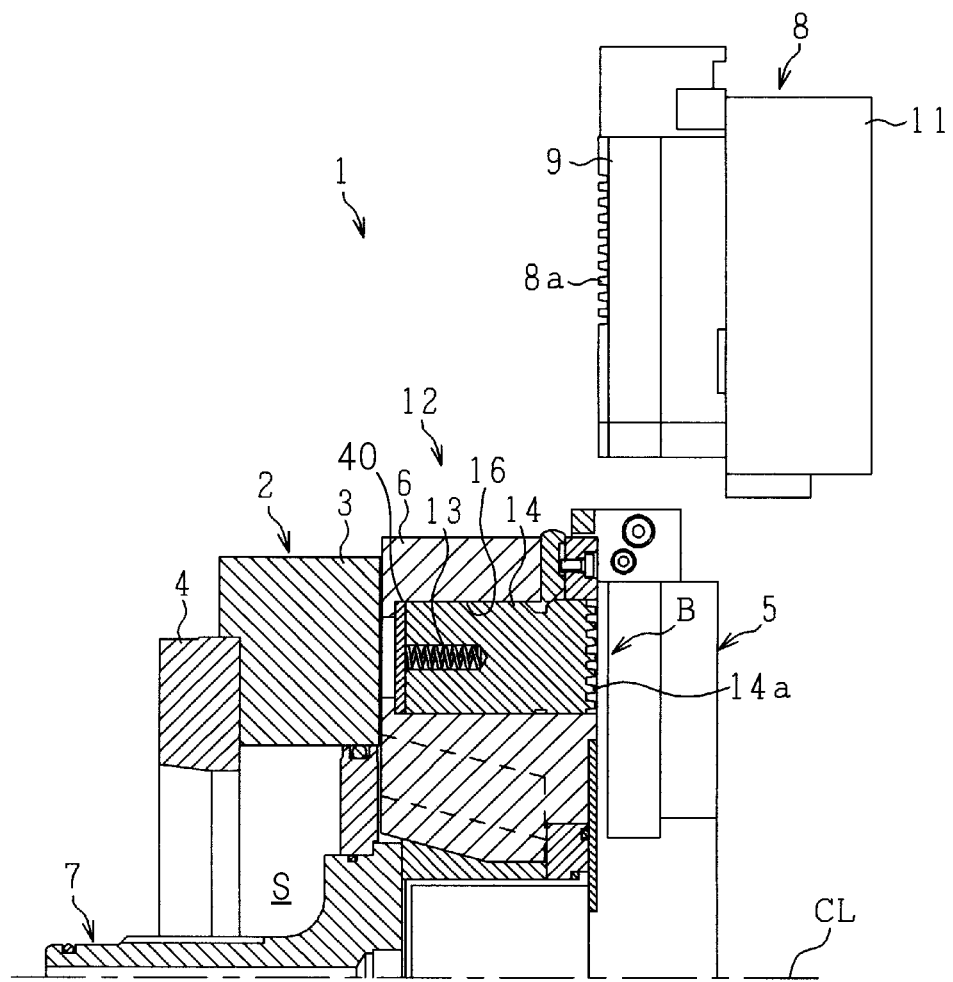
FIG. 2 is a view seen from II of FIG. 1, showing a section of a chuck body.

A chuck body 2 of a chuck 1 shown in FIGS. 1 and 2 comprises a front body 3, and a rear body 4 that closes a rear end surface of the front body 3 by attachment bolts (not shown). An inner space S is formed inside the front body 3 and the rear body 4 of the chuck body 2. As shown in FIG. 1, the front body 3 has a plurality of (e.g., three) attachment grooves 5 illustrated as attachment positions, for example. The attachment grooves 5 are equidistantly disposed in a circumferential direction. Master jaws 6 are disposed on the front body 3 correspondingly to the respective attachment grooves 5. As shown in FIG. 2, drive members 7 to be meshed with the respective master jaws 6 are disposed on a chuck axis line CL of the chuck body 2. Each master jaw 6 is radially moved along the attachment groove 5 by the movement of the drive member 7. As shown in FIG. 1, a plurality of (e.g., three) coupling mechanisms 12 described later are disposed in the chuck body 2 correspondingly to the attachment grooves 5. The coupling mechanism 12 is configured to couple a claw 8 inserted into the attachment groove 5 to the master jaw 6. As shown in FIG. 2, the claw 8 includes a base jaw 9 to be inserted into the attachment groove 5, and a top jaw 11 fixed on a front surface of the base jaw 9 by bolts 10. A cross-section of the base jaw 9 has the same shape as that of the attachment groove 5. In this specification, the right side in FIG. 2 is referred to as front side, and the left side is referred to as rear side.

The chuck-claw coupling mechanism (referred to simply as coupling mechanism 12 herebelow) according to this embodiment is a mechanism for coupling the claw 8 to the master jaw 6 provided in the aforementioned chuck body 2.

Figure 3:
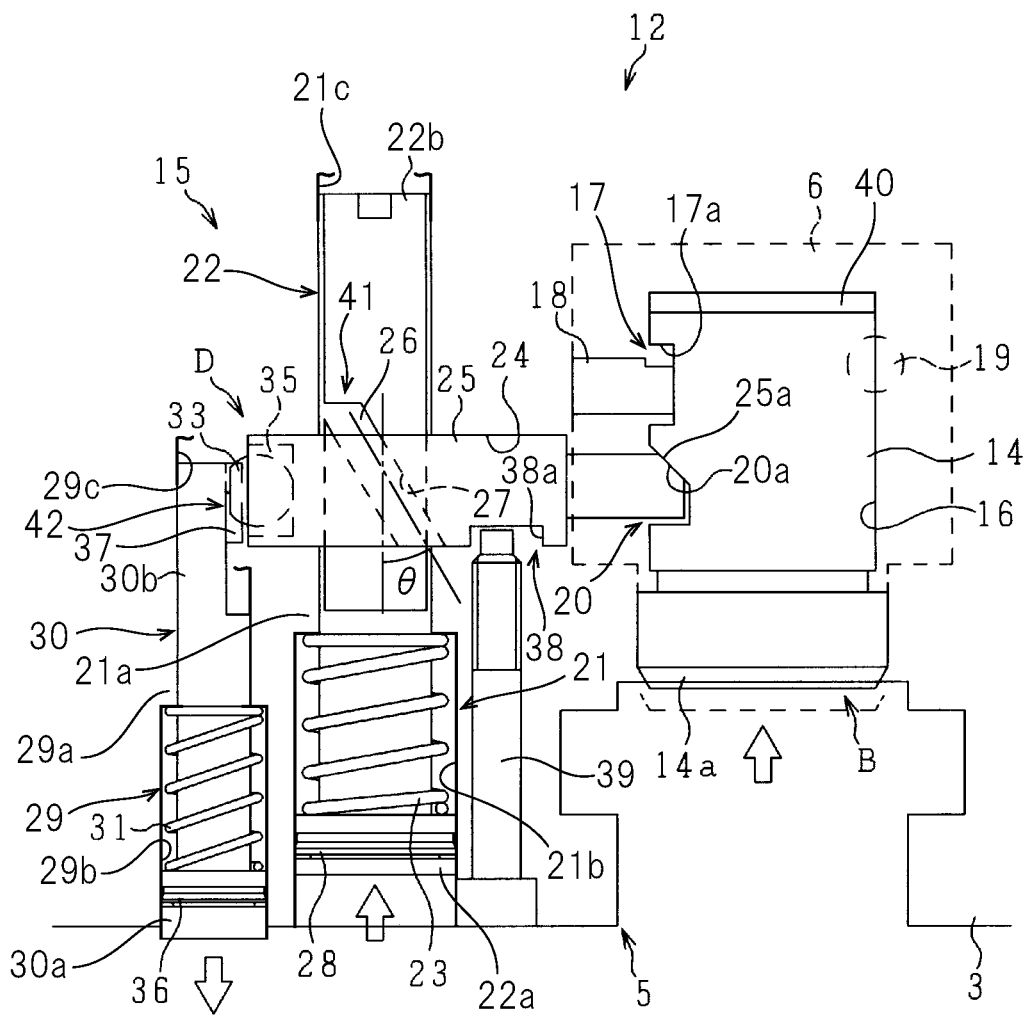
FIG. 3 is a view seen from III of FIG. 1, showing a state where a coupling member of the coupling mechanism is separated from a claw.

As shown in FIGS. 2 and 3, the coupling mechanism 12 comprises a coupling member 14 provided in the master jaw 6, a spring member 13 (first resilient member) that urges the coupling member 14 forward, and an operation unit 15. The coupling member 14 is movable between a coupling position A at which the coupling member 14 is coupled to the claw 8, and a separation position B at which the coupling member 14 is separated from the claw 8. The spring member 13 is configured to urge the coupling member 14 toward the coupling position A. The operation unit is configured to move the coupling member 14 to the separation position B.

Such a coupling mechanism 12 is described in more detail.

The coupling member 14 is urged by the spring member 13, which is illustrated as the first resilient member, toward a rack-like coupling surface 8a of the claw 8 inserted to the attachment groove 5. The coupling member 14 is configured to be moved between the coupling position A (see FIG. 6) at which the coupling member 14 is coupled to the coupling surface 8a of the claw 8, and the separation position B (see FIG. 3) at which the coupling member 14 is separated from the coupling surface 8a of the claw 8. The coupling member 14 is movable along the chuck axis line CL.

The master jaw 6 has a stepped coupling hole 16 that opens toward the attachment groove 5. The coupling member 14 is movably inserted into the coupling hole 16 to be fitted therein. As shown in FIG. 2, a plate 40 is disposed in the coupling hole 16. The aforementioned spring member 13 is interposed and sandwiched between the plate 40 and the coupling member 14. The coupling member 14 is urged toward the attachment groove 5 by the spring member 13.

As shown in FIG. 3, a positioning groove 17 is formed on an outer circumferential surface of the coupling member 14. The master jaw 6 is provided with a pin member 18 whose distal end projects into the coupling hole 16. Detachment of the coupling member 14 from the master jaw 6 is prevented by the engagement of the pin member 18 with the positioning groove 17.

As shown in FIG. 2, a rack-like coupling part 14a, which can be coupled to the coupling surface 8a of the claw 8, is formed on a distal end part (front end part) of the coupling member 14.

Figure 4:
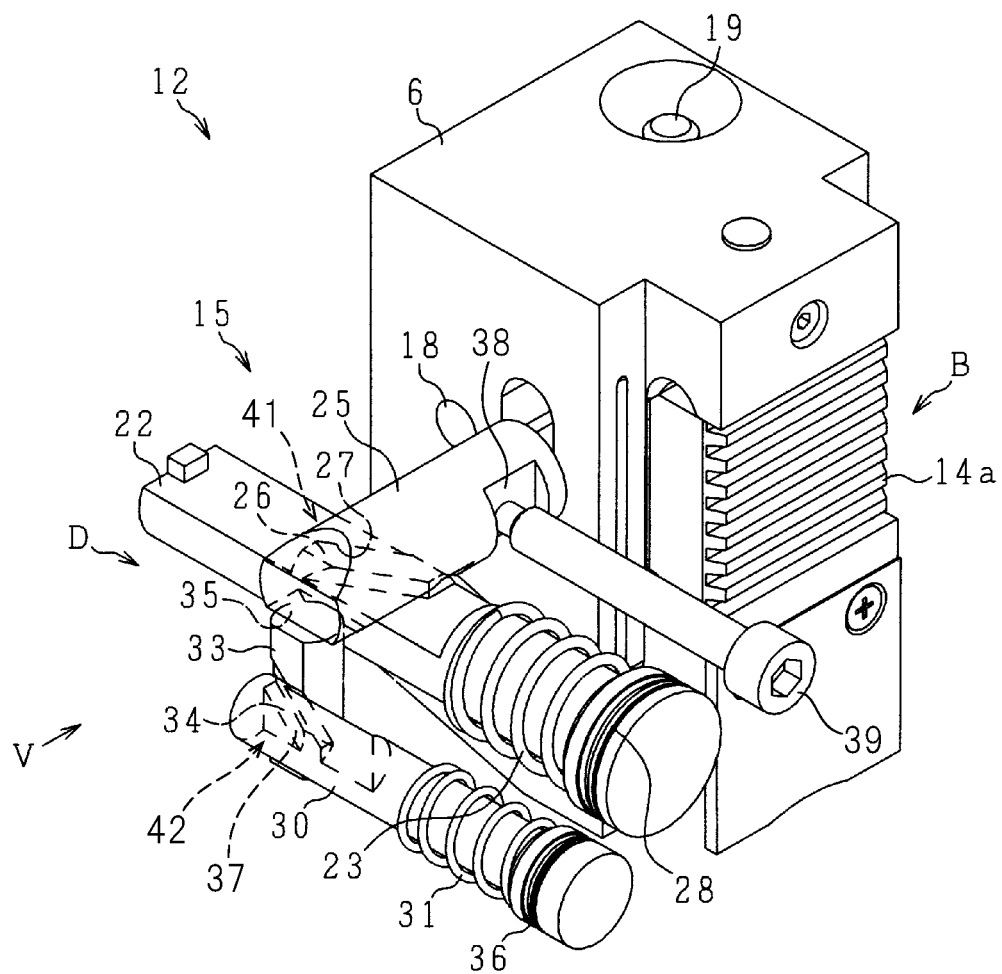
FIG. 4 is a perspective view of the coupling mechanism of FIG. 3.
Figure 6:
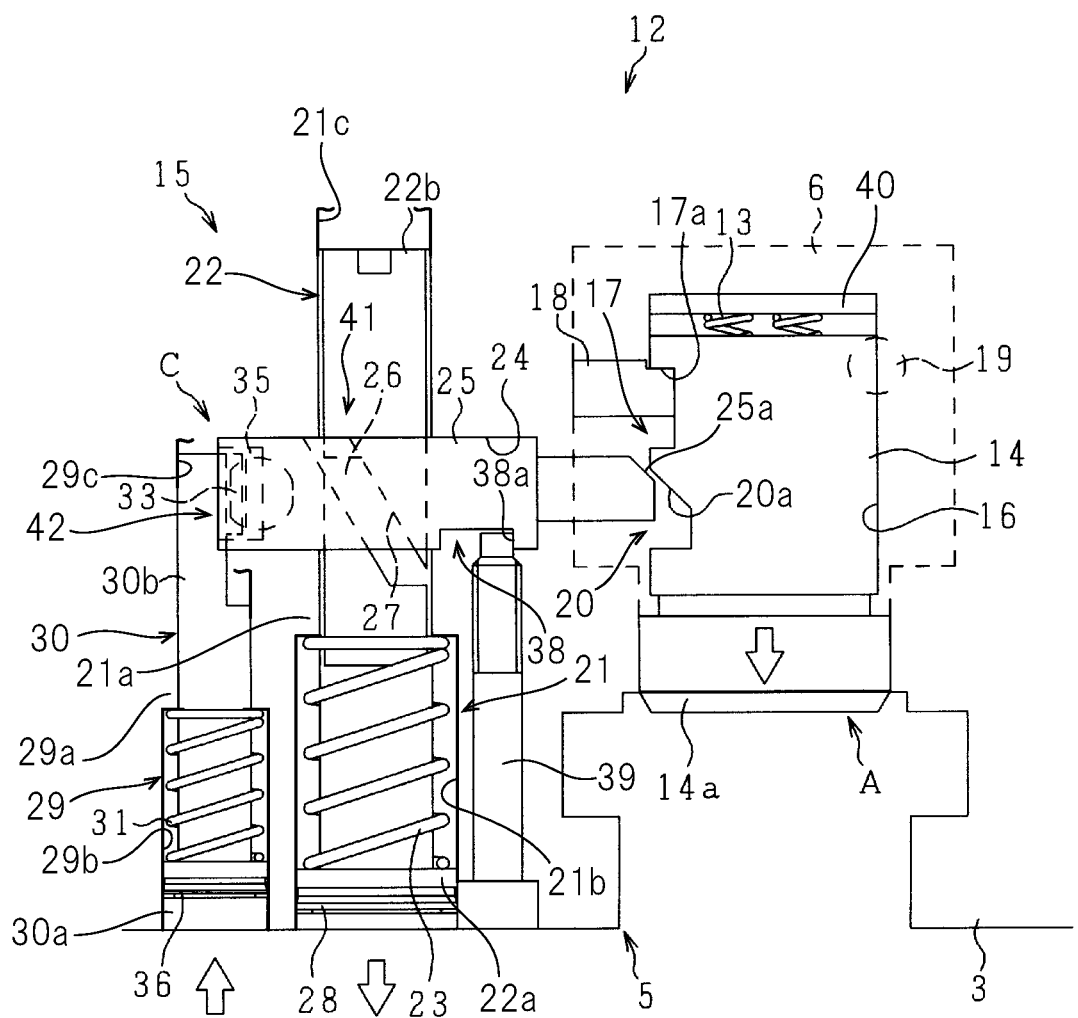
FIG. 6 is a view showing a state where the coupling member of the coupling mechanism is coupled to the claw.

As shown in FIGS. 3 and 4, a shaft member 19 that can be moved by the movement of the coupling member 14 is disposed in the master jaw 6. In a state where the pin member 18 is not in contact with a rear surface 17a of the positioning groove 17 of the coupling member 14, which is shown in FIG. 3, the shaft member 19 is positioned such that a distal end of the shaft member 19 is located below an outer surface (upper surface) of the master jaw 6, which is shown in FIG. 4. In a state where the pin member 18 is in contact with the rear surface 17a of the positioning groove 17 of the coupling member 14, which is shown in FIG. 6, the shaft member 19 is positioned such that the distal end of the shaft member 19 is coplanar with the outer surface (upper surface) of the master jaw 6.

In addition, as shown in FIG. 3, an engagement groove part 20 having an inclined surface 20a is formed on the outer circumferential surface of the coupling member 14.

The aforementioned operation unit 15 is described below.

As shown in FIG. 3, the operation unit 15 has an operation member 25 which can be moved into and retracted from the aforementioned engagement groove part 20. The operation member 25 is movable between an engagement position D (see FIG. 3) at which the operation member 25 is moved into and engaged with the engagement groove part 20 of the coupling member 14, and a disengagement position C (see FIG. 6) at which the operation member 25 is retracted from the engagement position D to be disengaged from the engagement groove part 20. In a state where the operation member 25 is located at the engagement position D, the coupling member 14 is located at the separation position B (see FIG. 3). The operation member 25 is disposed laterally to the coupling member 14, and can be moved in a direction orthogonal to the movement direction of the coupling member 14, i.e., in the horizontal direction.

The operation unit 15 further has an unlocking member 22, and a spring member 23 (second resilient member) that urges the unlocking member 22 forward. The unlocking member 22 is movable between a first unlocking-member position (see FIG. 3) at which the unlocking member 22 locates the operation member 25 at the engagement position D, and a second unlocking-member position (see FIG. 6) at which the unlocking member 22 locates the operation member 25 at the disengagement position C. The spring member 23 is configured to urge the unlocking member 22 toward the second unlocking-member position. The unlocking member 22 is disposed below the operation member 25, and is movable in a direction along the movement direction of the coupling member 14.

To be more specific, the front body 3 has an unlocking hole 21 having a stepped part 21a. The unlocking hole 21 extends along the chuck axis line CL and opens to a front surface of the front body 3. The unlocking member 22 is movably inserted into the unlocking hole 21 to be fitted therein. The unlocking hole 21 includes the aforementioned stepped part 21a, a larger-diameter hole 21b formed on the front side of the stepped part 21a, and a smaller-diameter hole 21c formed on the rear side of the stepped part 21a.

The spring member 23 illustrated as the second resilient member is interposed between the larger-diameter hole 21b of the unlocking hole 21 and a larger-diameter part 22a of the unlocking member 22. The unlocking member 22 is urged forward (toward second unlocking-member position) by the spring member 23.

An operation hole 24 is continuously formed on the unlocking hole 21. The operation hole 24 extends in a direction perpendicular to the unlocking hole 21. One end of the operation hole 24 opens to the aforementioned coupling hole 16, and the other end thereof opens to an outer circumferential surface of the front body 3. The operation member 25 is movably inserted into the operation hole 24 to be fitted therein.

The unlocking member 22 is configured to move the operation member 25 through a first transmission mechanism 41. The first transmission mechanism 41 includes a first inclination groove part 27 provided on one of the operation member 25 and the unlocking member 22, and a first inclination projection part 26 provided on the other thereof. An inclined surface of the first inclination projection part 26 extends along the first inclination groove part 27, and the first inclination projection part 26 is engaged with the first inclination groove part 27. In this embodiment, the first inclination projection part 26 is provided on a smaller-diameter part 22b of the unlocking member 22, which is formed on the rear side of the larger-diameter part 22a thereof. The smaller-diameter part 22b has a flat upper surface and is formed such that the first inclination projection part 26 projects upward from the flat upper surface. The first inclination groove part 27 is provided on a lower part of the operation member 25. Thus, when the unlocking member 22 is moved, the operation member 25 is configured to be moved.

As shown in FIG. 3, an acute angle θ of angles, which are defined by a direction along which the first inclination groove part 27 and the first inclination projection part 26 extend, and the movement direction of the unlocking member 22 (direction along chuck axis line CL), may be less than 45°. Thus, a force transmitted from the unlocking member 22 to the operation member 25 can be made larger than a force of the moving unlocking member 22.

As shown in FIG. 6, in a state where the unlocking member 22 is urged toward the front of the chuck body 2 by the spring member 23, the unlocking member 22 is located at the second unlocking-member position, and the operation member 25 is located at the disengagement position C so that the distal end thereof is separated from the engagement groove part 20 of the coupling member 14. On the other hand, as shown in FIG. 3, when the unlocking member 22 is moved rearward of the chuck body 2, the unlocking member 22 is located at the first unlocking-member position, and the operation member 25 is moved to the engagement position D so that the distal end thereof is engaged with the engagement groove part 20 of the coupling member 14.

A first seal member 28 is fitted, in a front part of the unlocking hole 21, between the larger-diameter part 22a of the unlocking member 22 and the larger-diameter hole 21b of the unlocking hole 21. Thus, a space between the larger-diameter part 22a of the unlocking member 22 and the larger-diameter hole 21b of the unlocking hole 21 is sealed.

As shown in FIG. 3, a positioning groove 38 is formed on an outer surface of the operation member 25. The front body 3 is provided with a pin member 39 whose a distal end projects into the operation hole 24. Detachment of the operation member 25 from the operation hole 24 is prevented by the engagement of the pin member 39 with the positioning groove 38. As shown in FIG. 6, in a state where the operation member 25 is located at the disengagement position C, the pin member 39 is configured to be in contact with a surface 38a of the positioning groove 38, which is closer to the coupling member 14.

The operation unit 15 further has a locking member 33, a lock holding member 30, and a spring member 31 (third resilient member) that urges the lock holding member 30. The locking member 33 is movable between a locking position at which the locking member 33 locks the movement of the operation member 25 located at the engagement position D, and an unlocking position at which the locking member 33 unlocks the operation member 25. The locking member 33 can be moved in a direction orthogonal to the movement direction of the operation member 25, i.e., the vertical direction (up and down direction). The lock holding member 30 is movable between a first holding-member position (see FIG. 3) at which the lock holding member 30 locates the locking member 33 at the locking position, and a second holding-member position (see FIG. 6) at which the lock holding member 30 locates the locking member 33 at the unlocking position. The spring member 31 is configured to urge the lock holding member 30 toward the second holding-member position. The lock holding member 30 can be moved in a direction along the movement direction of the unlocking member 22, and can be moved in a direction perpendicular to the movement direction of the locking member 33.

To be more specific, the front body 3 has a lock holding hole 29 having a stepped part 29a. The lock holding hole 29 extends along the chuck axis line CL and opens to the front surface of the front body 3. The lock holding hole 29 is provided parallel to the unlocking hole 21. The lock holding member 30 is movably inserted into the lock holding hole 29 to be fitted therein. The lock holding hole 29 includes the aforementioned stepped part 29a, a larger-diameter hole 29b formed on the front side of the stepped part 29a, and a smaller-diameter hole 29c formed on the rear side of the stepped part 29a.

The spring member 31 illustrated as the third resilient member is interposed between the stepped part 29a of the lock holding hole 29 and a larger-diameter part 30a of the lock holding member 30. The lock holding member 30 is urged forward (toward second holding-member position) by the spring member 31.

Figure 5:
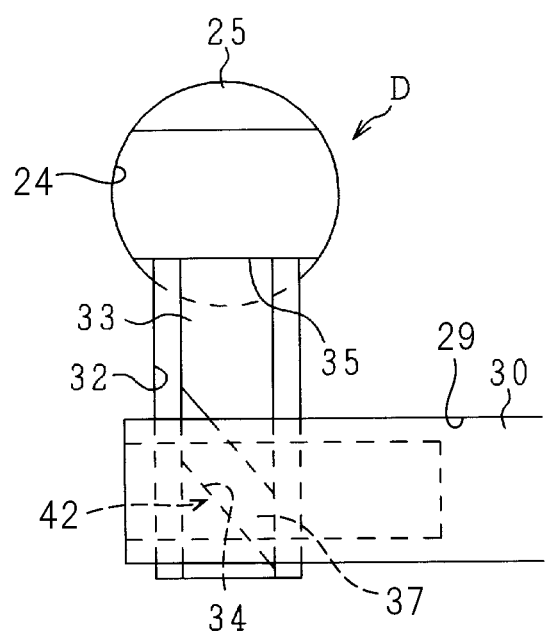
FIG. 5 is a partially enlarged view seen from V of FIG. 4.
Figure 8:
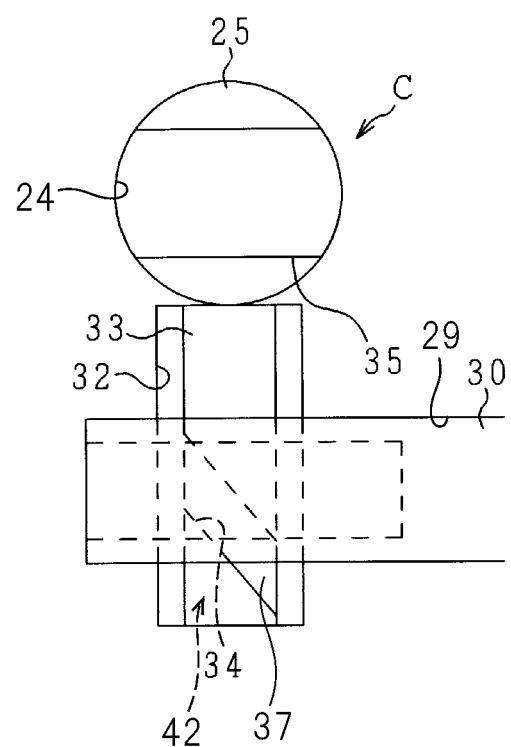
FIG. 8 is a partially enlarged view seen from VIII of FIG. 7.

The lock holding hole 29 and the operation hole 24 communicate with each other by a communication hole 32 shown in FIGS. 5 and 8. The communication hole 32 extends vertically. The locking member 33 is inserted into the communication hole 32 to be fitted therein.

The lock holding member 30 is configured to move the locking member 33 through a second transmission mechanism 42. As shown in FIGS. 3 to 5, the second transmission mechanism 42 includes a second inclination groove part 34 provided on one of the locking member 33 and the lock holding member 30, and a second inclination projection part 37 provided on the other thereof. An inclined surface of the second inclination projection part 37 extends along the second inclination groove part 34, and the second inclination projection part 37 is engaged with the second inclination groove part 34. In this embodiment, the second inclination projection part 37 is provided on a smaller-diameter part 30b of the lock holding member 30, which is formed on the rear side of the larger-diameter part 30a thereof. The smaller-diameter part 30b has a flat surface closer to the locking member 33 and the second inclination projection part 37 is formed to project from the flat surface toward the locking member 33. The second inclination groove part 34 is provided on a part of the locking member 33, which is closer to the lock holding member 30. Thus, when the second inclination projection part 37 of the lock holding member 30 is engaged with the second inclination groove part 34 and the lock holding member 30 is moved, the locking member 33 is configured to be moved.

As shown in FIG. 3, in a state where the lock holding member 30 is urged forward by the spring member 31, the lock holding member 30 is located at the second holding-member position, and the locking member 33 is located at the locking position by moving toward the operation member 25. On the other hand, as shown in FIG. 6, when the lock holding member 30 is moved rearward of the chuck body 2, the lock holding member 30 is located at the first holding-member position, and the locking member 33 is moved away from the operation member 25 to be located at the unlocking position.

In addition, as shown in FIGS. 3 to 5, the operation member 25 has, on its rear end part, a flatly cut locking part 35 engageable with a distal end of the locking member 33. When the locking member 33 is located at the locking position, the distal end of the locking member 33 is brought into contact with the locking part 35 to be engaged therewith.

A second seal member 36 is fitted, in a front part of the lock holding hole 29, between the larger-diameter part 30a of the lock holding member 30 and the larger-diameter hole 29b of the lock holding hole 29. Thus, a space between the larger-diameter part 30a of the lock holding member 30 and the larger-diameter hole 29b of the lock holding hole 29 is sealed.

Next, a method of replacing chuck claws by using the above structured coupling mechanism 12 according to the embodiment is described.

Figure 9:
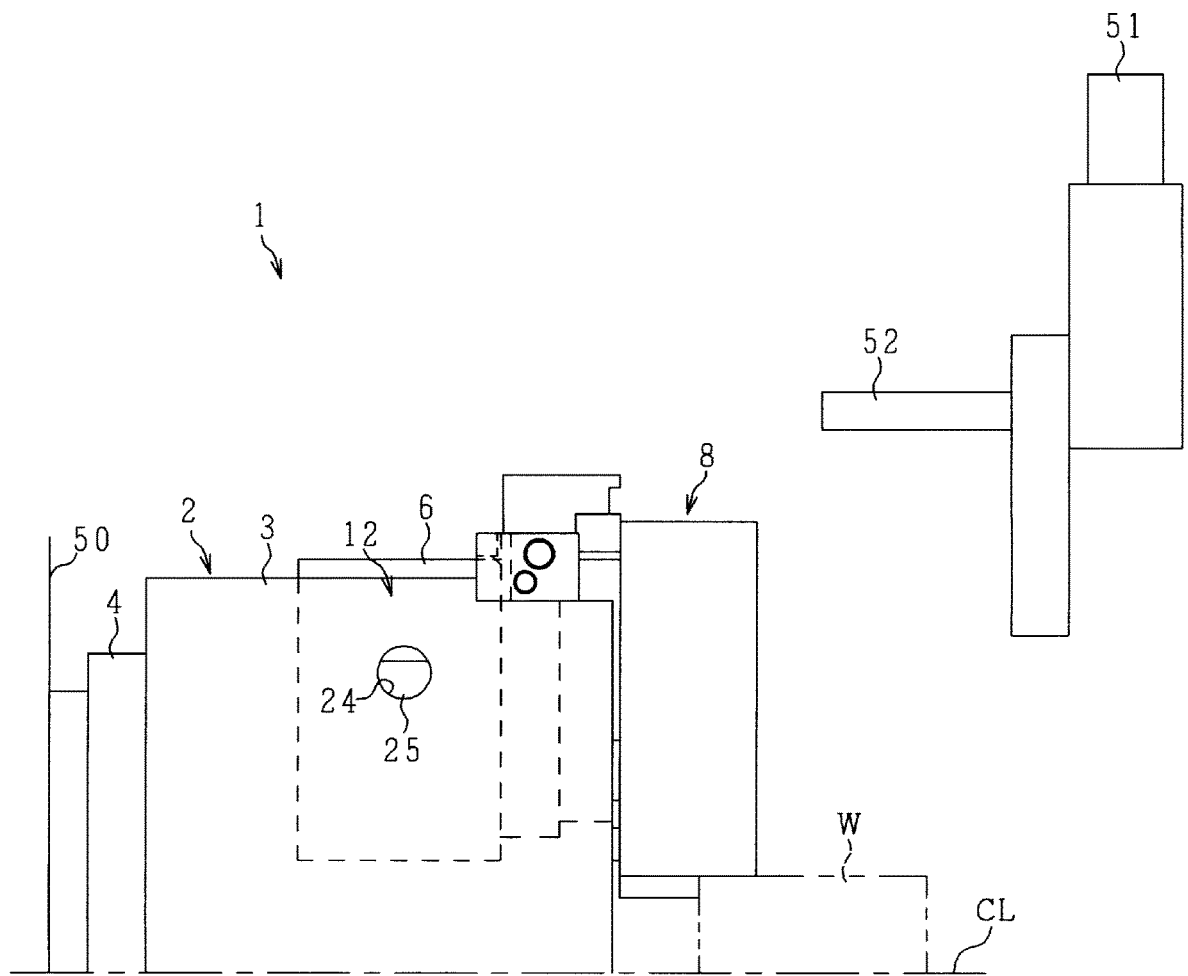
FIG. 9 is a view showing a state where a workpiece is clamped.

As shown in FIG. 9, the chuck 1 comprising the aforementioned coupling mechanism 12 is secured to a spindle 50 of a machine tool such as an NC lathe, and clamps a workpiece W transferred by a loader 51 illustrated as a transfer apparatus. The clamped workpiece W is processed by moving a cutter holder with cutters (not shown) in front, rear, right and left directions. When workpieces W are exchanged, for example, a claw 8 of the chuck 1 is replaced with another claw 8 in accordance with a diameter of a new workpiece W.

When the claws 8 are replaced by hand or by a claw automatic replacement apparatus, a pressing member 52 installed on the loader 51 is pressed onto the front end surface of the unlocking member 22 from the front side of the chuck body 2. Then, the unlocking member 22 is inserted into the unlocking hole 21 and is moved rearward of the chuck body 2 against the spring force, so as to be located at the first unlocking-member position shown in FIG. 3. In this embodiment, the pressing member 52 is attached to the loader 51, but the pressing member 52 may be attached to a turret or a mill shaft used for processing a workpiece W.

While the unlocking member 22 is moved to the first unlocking-member position, a force received by the unlocking member 22 from the pressing member 52 is transmitted to the operation member 25 through the first transmission mechanism 41, so that the operation member 25 is moved toward the coupling member 14. The operation member 25 is moved into the engagement position D at which the distal end of the operation member 25 is moved into and engaged with the engagement groove part 20 of the coupling member 14. Thus, a distal inclined surface 25a of the operation member 25 is pressed against the inclined surface 20a of the engagement groove pat 20, so that the coupling member 14 is moved to the separation position B at which the coupling member 14 is separated from the coupling surface 8a of the claw 8.

Since the coupling member 14 has been moved, the distal end of the shaft member 19 is located below the outer surface of the master jaw 6. In addition, the locking member 33 is moved toward the locking part 35 of the operation member 25 to be located at the locking position, so that the distal end of the locking member 33 is brought into contact with the locking part 35 to be engaged therewith (see FIG. 5). Since the lock holding member 30 is urged toward the front the chuck body 2 by the spring member 31, the movement of the locking member 33 is locked by the lock holding member 30 and the spring member 31, and the movement of the operation member 25 is locked by the locking member 33. Namely, once the movement of the operation member 25 is locked, the movements of the unlocking member 22 and the coupling member 14 are also locked.

Thereafter, the position of the shaft member 19 is checked visually or by a sensor. When it is determined that the claw 8 and the master jaw 6 are disconnected from each other, the pressing member 52 is pulled out from the unlocking hole 21 and is moved to a position apart from the chuck body 2. The claw 8 is taken out from the attachment groove 5 of the chuck body 2 by hand or by a claw automatic replacement apparatus. Thereafter, a new claw 8 in accordance with a diameter of a workpiece W to be processed is inserted into this attachment groove 5.

After the claw 8 has been inserted into the attachment groove 5, as shown in FIG. 6, the pressing member 52 (see FIG. 9) is pressed onto the front end surface of the lock holding member 30 from the front side of the chuck body 2. Then, the lock holding member 30 is inserted into the lock holding hole 29 and is moved rearward of the chuck body 2 against the spring force, so as to be located at the first holding-member position shown in FIG. 6.

Figure 7:
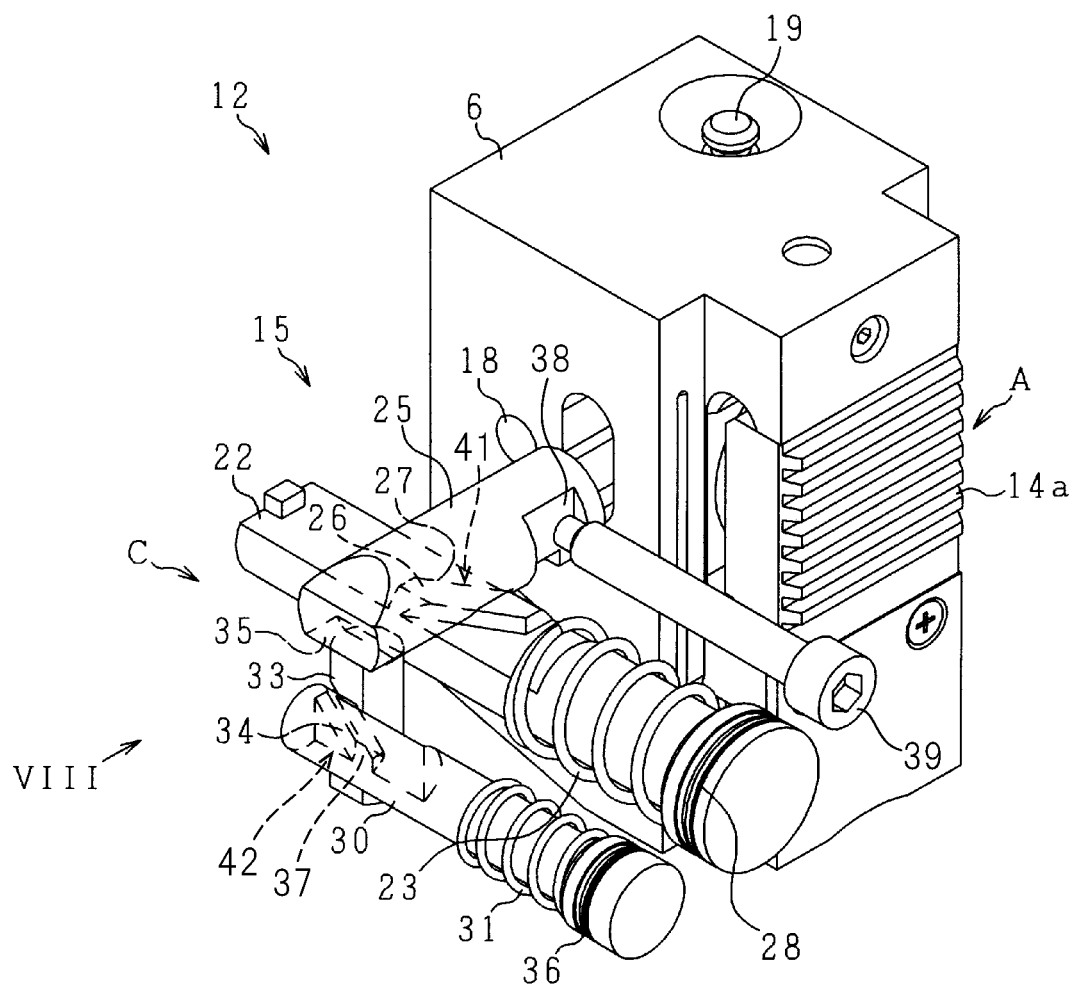
FIG. 7 is a perspective view of the coupling mechanism of FIG. 6.

During the movement of the lock holding member 30 toward the first holding-member position, a force received by the lock holding member 30 from the pressing member 52 is transmitted to the locking member 33 through the second transmission mechanism 42, so that the locking member 33 is moved away from the operation member 25. Thus, the locking member 33 is located at the unlocking position, so that the movement of the operation member 25 is unlocked. In this case, the unlocking member 22 is urged toward the front of the chuck body 2 by the spring member 23, to be moved to the second unlocking-member position (see FIG. 3). At this time, a force received by the unlocking member 22 from the spring member 23 is transmitted to the operation member 25 through the first transmission mechanism 41. Thus, the operation member 25 is moved to the disengagement position C at which the operation member 25 is separated from the coupling member 14, so that the coupling member 14 and the operation member 25 are disengaged from each other. The distal end of the locking member 33 located at the unlocking position is brought into contact with a part of the operation member 25 other than the locking part 35 (part nearer to coupling member 14 than locking part 35) (see FIGS. 6 to 8).

Since the coupling member 14 is urged toward the attachment groove 5 by the spring member 13, the coupling member 14 is moved to the coupling position A at which the coupling member 14 is coupled to the coupling surface 8a of the claw 8. Thus, the claw 8 is coupled to the master jaw 6 through the coupling member 14.

Since the coupling member 14 has been moved, the distal end of the shaft member 19 becomes coplanar with the outer surface of the master jaw 6. Since the unlocking member 22 is urged toward the front of the chuck body 2 by the spring member 23, the movement of the operation member 25 is locked by the unlocking member 22 and the spring member 23.

Thereafter, the distal end position of the shaft member 19 is checked visually or by a sensor to determine whether the claw 8 and the master jaw 6 are coupled to each other through the coupling member 14. Then, the pressing member 52 is pulled out from the lock holding hole 29 and is moved to a position apart from the chuck body 2.

Claws 8 of the other attachment grooves 5 are replaced similarly to the above. After all the claws 8 have been replaced, workpieces W are clamped by the chuck 1 and are processed.

Due to the above structure, the coupling member 14 is provided movably between the coupling position A at which the coupling member 14 is coupled to the coupling surface 8a of the claw 8, and the separation position B at which the coupling member 14 is separated from the coupling surface 8a of the claw 8. The coupling member 14 can be moved to any of the position by the operation 15 operated from the front side of the chuck body 2. This can eliminate necessity of providing a large space around an outer circumference of the chuck 1.

Here, a case in which jaws can be replaced while a handle is being inserted in an operation element, which is shown in the aforementioned Patent Document 1, is reviewed. A tool setter may be installed and/or a cover, a coolant pipe, an air pipe, etc. may be installed around an outer circumference of a chuck used in a machine tool such as an NC lathe. However, as shown in the above Patent Document 1, in a case where movement and/or rotation of the operation element is performed by means of the handle from outside a body in a limited space around the outer circumference of the chuck, there is a problem in that an operation for locking a jaw on a master jaw via a meshing member takes a long time. In addition, there is another problem in that a large space is needed around the outer circumference of the chuck. Moreover, since the handle is used only when an operation for replacing jaws, the handle is stored in another place.

On the other hand, in this embodiment, an operation for coupling the claw 8 to be disposed in the attachment groove 5 of the chuck body 2 to the master jaw 6 can be rapidly performed. In addition, since the operation unit 15 can be operated from the front side of the chuck body 2, it is not necessary to provide a large space for such an operation around the outer circumference of the chuck. Moreover, since the operation unit 15 can be operated by using the loader 51, a handle can be omitted and thus a place for storing the handle is no more necessary.

In addition, the chuck body 2 is provided with the coupling mechanism 12 comprising the coupling member 14 that is urged, by the spring member 13, toward the coupling surface 8a of the claw 8 disposed in the attachment groove 5, and the operation unit 15 that moves the coupling member 14 to the coupling position A at which the coupling member 14 is coupled to the coupling surface 8a of the claw 8, and the separation position B at which the coupling member 14 is separated from the coupling surface 8a of the claw 8. The coupling member 14 is provided on the master jaw 6. The operation unit 15 has the unlocking member 22 urged toward the front of the chuck body 2 by the spring member 23, and the operation member 25 operated by the movement of the unlocking member 22. In a state where the unlocking member 22 is urged toward the front of the chuck body 2 by the spring member 23, the operation member 25 and the coupling member 14 can be disengaged from each other, and the coupling member 14 can be moved to the coupling position A at which the coupling member 14 is coupled to the coupling surface 8a of the claw 8. Thus, the claw 8 can be coupled to the master jaw 6 through the coupling member 14. On the other hand, in a state where the unlocking member 22 has been moved rearward of the chuck body 2, the operation member 25 and the coupling member 14 are engaged with each other so that the coupling member 14 can be moved to the separation position B at which the coupling member 14 is separated from the coupling surface 8a of the claw 8. Thus, it is not necessary to provide a large space around the outer circumference of the chuck 1, and an operation for replacing claws 8 can be rapidly performed from the front side of the chuck body 2.

Further, the locking member 33 engageable with the rear end part of the operation member 25 is provided, and the locking member 33 is engaged with the lock holding member 30 urged toward the front of the chuck body 2 by the spring member 31. When the operation member 25 is moved together with the movement of the unlocking member 22, the locking member 33 can be engaged with the rear end part of the operation member 25. Thus, the pressing member 52 can be separated from the chuck body 2. Thus, the space on the front side of the chuck body 2 can be effectively used, and an operation for replacing claws 8 can be easily performed. In addition, the operation member 25 can be moved through the inclination projection part 26 including the inclined surface provided on the unlocking member 22. Even when a force of the pressing member 52 pushing the unlocking member 22 is smaller than a spring force of the spring member 13 that urges the coupling member 14, the coupling member 14 can be moved against the spring force. The seal members 28, 36 are respectively fitted in the unlocking member 22 and the lock holding member 30 that are urged toward the front of the chuck body 2 by the spring members 23, 31. Thus, when the front surface of the chuck body 2 faces upward, and chips, cutting fluid, etc. generated during a process of a workpiece W adhere to the front surface of the chuck body 2, the seal members 28, 36 can prevent the chips, the cutting fluid, etc. from entering the inside of the chuck body 2. Thus, the unlocking member 22 and the lock holding member 30 can be reliably moved.

According to this embodiment, the coupling member 14 provided in the master jaw 6 is urged, by the spring member 13, toward the coupling position A at which the coupling member 14 is coupled to the claw 8, and the coupling member 14 can be moved by the operation unit 15 to the separation position B at which the coupling member 14 is separated from the claw 8. Thus, the coupling member 14 can be easily moved by the operation unit 15 between the coupling position A and the separation position B. As a result, the claw 8 disposed in the attachment groove 5 of the chuck body 2 can be rapidly coupled to the maser jaw 6.

In addition, according to this embodiment, the operation unit 15 has the operation member 25 that is movable between the engagement position D at which the operation member 25 is engaged with the engagement groove part 20 of the coupling member 14, and the disengagement position C at which the operation member 25 is disengaged therefrom; and in a state where the operation member 25 is located at the engagement position D, the coupling member 14 can be located at the separation position B. When the operation member 25 is located at the engagement position D, the coupling member 14 can be located at the separation position B. On the other hand, when the operation member 25 is be located at the disengagement position C, the coupling member 14 can be located at the coupling position A. Thus, the coupling member 14 can be easily moved to the coupling position A and the separation position B, whereby the claw 8 can be rapidly coupled to the master jaw 6.

In addition, according to this embodiment, the operation unit 15 has the unlocking member 22 that is movable between the first unlocking-member position at which the unlocking member 22 locates the operation member 25 at the engagement position D, and the second unlocking-member position at which the unlocking member 22 locates the operation member 25 at the disengagement position C; and the unlocking member 22 is urged toward the second unlocking-member position by the spring member 23. Thus, when the unlocking member 22 is located at the first unlocking-member position, the operation member 25 can be located at the engagement position D and the coupling member 14 can be located at the separation position B. On the other hand, when the unlocking member 22 is located at the second unlocking-member position, the operation member 25 can be located at the disengagement position C and the coupling member 14 can be located at the coupling position A. Thus, the coupling member 14 can be easily moved to the coupling position A and the separation position B, whereby the claw 8 can be rapidly coupled to the master jaw 6.

In addition, according to this embodiment, the unlocking member 22 moves the operation member 25 through the first transmission mechanism 41; and the first transmission mechanism 41 has the first inclination groove part 27 provided one of the operation member 25 and the unlocking member 22, and the first inclination projection part 26 provided on the other thereof. Thus, the operation member 25 can be easily moved by a force received by the unlocking member 22.

In addition, according to this embodiment, the chuck body 2 is provided with the unlocking hole 21 into which the unlocking member 22 is movably inserted, and the unlocking hole 21 opens to the front surface of the chuck body 2. Thus, the unlocking member 22 can be operated from the front side of the chuck body 2. This can eliminate necessity of providing a large space for operating the operation unit 15 around an outer circumference of the chuck 1.

In addition, according to this embodiment, the first seal member 28 is fitted, in the front part of the unlocking hole 21, between the unlocking member 22 and the unlocking hole 21. Thus, chips, cutting fluid, etc. can be prevented from entering a gap between the unlocking member 22 and the unlocking hole 21, which can prevent movement of the unlocking member 22 from being hindered.

In addition, according to this embodiment, the operation unit 15 further has the locking member 33 that is movable between the locking position at which the locking member 33 locks the operation member 25 located at the engagement position D, and the unlocking position at which the locking member 33 unlocks the operation member 25. Thus, the movement of the operation member 25 located at the engagement position D can be locked. In a state where the locking member 33 is located at the locking position, the operation member 25 can be maintained at the engagement position D, and the coupling member 14 can be maintained at the separation position B.

In addition, according to this embodiment, the operation unit 15 has the lock holding member 30 that is movable between the first holding-member position at which the lock holding member 30 locates the locking member 33 at the locking position, and the second holding-member position at which the lock holding member 30 locates the locking member 33 at the unlocking position; and the lock holding member 30 is urged toward the second holding-member position by the spring member 31. Thus, when the lock holding member 30 is located at the first holding-member position, the locking member 33 can be located at the locking position so that the movement of the operation member 25 can be locked. On the other hand, when the lock holding member 30 is located at the second holding-member position, the locking member 33 can be located at the unlocking position so that the operation member 25 can be moved.

In addition, according to this embodiment, the lock holding member 30 moves the locking member 33 through the second transmission mechanism 42; and the second transmission mechanism 42 has the second inclination groove part 34 provided one of the locking member 33 and the lock holding member 30, and the second inclination projection part 37 provided on the other thereof. Thus, the locking member 33 can be easily moved by a force received by the locking holding member 30.

In addition, according to this embodiment, the chuck body 2 is provided with the lock holding hole 29 into which the lock holding member 30 is movably inserted opens to the front surface of the chuck body 2 is inserted, and the lock holding hole 29 opens to the front surface of the chuck body 2. Thus, the lock holding member 30 can be operated from the front side of the chuck body 2. This can eliminate necessity of providing a large space for operating the operation unit 15 around an outer circumference of the chuck 1.

In addition, according to this embodiment, the second seal member 36 is fitted between the lock holding member 30 and the lock holding hole 29, in the front part of the lock holding hole 29. Thus, chips, cutting fluid, etc. can be prevented from entering a gap between the lock holding member 30 and the lock holding hole 29, which can prevent movement of the lock holding member 30 from being hindered.

The present invention is not limited to the aforementioned embodiment, and a part of the structure thereof can be suitably modified within a range not exceeding from the scope of the present invention.

The invention claimed is:

1. A chuck-claw coupling mechanism for coupling a claw to a master jaw provided in a chuck body, comprising:
    a coupling member provided in the master jaw, the coupling member being movable between a coupling position at which the coupling member is coupled to the claw, and a separation position at which the coupling member is separated from the claw;

a first resilient member that urges the coupling member toward the coupling position; and an operation unit that moves the coupling member to the separation position.

2. The chuck-claw coupling mechanism according to claim 1, wherein:

the coupling member has an engagement groove part;

the operation unit has an operation member that is capable of being moved into and retracted from the engagement groove part, the operation member being movable between an engagement position at which the operation member is moved into and engaged with the engagement groove part of the coupling member, and a disengagement position at which the operation member is retracted from the engagement position to be disengaged from the engagement groove part; and in a state where the operation member is located at the engagement position, the coupling member is located at the separation position.

3. The chuck-claw coupling mechanism according to claim 2, wherein the operation unit has: an unlocking member that is movable between a first unlocking-member position at which the unlocking member locates the operation member at the engagement position, and a second unlocking-member position at which the unlocking member locates the operation member at the disengagement position; and a second resilient member that urges the unlocking member toward the second unlocking-member position.

4. The chuck-claw coupling mechanism according to claim 3, wherein:

the unlocking member moves the operation member through a first transmission mechanism; and the first transmission mechanism has a first inclination groove part provided on one of the operation member and the unlocking member, and a first inclination projection part provided on the other thereof, the first inclination projection part extending along the first inclination groove part to be engaged with the first inclination groove part.

5. The chuck-claw coupling mechanism according to claim 4, wherein an acute angle of angles, . . .

which are defined by a direction along which the first inclination groove part and the first inclination projection part extend, and a movement direction of the unlocking member, is less than 45°.

6. The chuck-claw coupling mechanism according to claim 3, wherein:

the chuck body is provided with an unlocking hole into which the unlocking member is movably inserted; and the unlocking hole opens to a front surface of the chuck body.

7. The chuck-claw coupling mechanism according to claim 6, wherein a first seal member is fitted between the unlocking member and the unlocking hole, in a front part of the unlocking hole.

8. The chuck-claw coupling mechanism according to claim 2, wherein the operation unit further has a locking member that is movable between a locking position at which the locking member locks the operation member located at the engagement position, and an unlocking position at which the locking member unlocks the operation member.

9. The chuck-claw coupling mechanism according to claim 8, wherein the operation unit further has: a lock holding member that is movable between a first holding-member position at which the lock holding member locates the locking member at the locking position, and a second holding-member position at which the lock holding member locates the locking member at the unlocking position; and a third resilient member that urges the lock holding member toward the second holding-member position.

10. The chuck-claw coupling mechanism according to claim 9, wherein:

the lock holding member moves the locking member through a second transmission mechanism; and the second transmission mechanism has a second inclination groove part provided on one of the locking member and the lock holding member, and a second inclination projection part provided on the other thereof, the second inclination projection part extending along the second inclination groove part to be engaged with the second inclination groove part.

11. The chuck-claw coupling mechanism according to claim 9, wherein:

the chuck body is provided with a lock holding hole into which the lock holding member is movably inserted; and the lock holding hole opens to the front surface of the chuck body.

12. The chuck-claw coupling mechanism according to claim 11, wherein a second seal member is fitted between the lock holding member and the lock holding hole, in a front part of the lock holding hole.

* * * * *